(12) United States Patent
Xie et al.

(10) Patent No.: US 10,864,543 B2
(45) Date of Patent: Dec. 15, 2020

(54) MATERIAL DELIVERY SYSTEM FOR LAMINATOR

(71) Applicant: Dow Global Technologies LLC, Midland, MI (US)

(72) Inventors: Rui Xie, Pearland, TX (US); Yinzhong Guo, Pearland, TX (US); Kalyan Sehanobish, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/574,401

(22) PCT Filed: Mar. 10, 2016

(86) PCT No.: PCT/US2016/021648
§ 371 (c)(1),
(2) Date: Nov. 15, 2017

(87) PCT Pub. No.: WO2016/186712
PCT Pub. Date: Nov. 24, 2016

(65) Prior Publication Data
US 2018/0133743 A1 May 17, 2018

Related U.S. Application Data

(60) Provisional application No. 62/162,113, filed on May 15, 2015.

(51) Int. Cl.
| | | |
|---|---|---|
| B05C 1/08 | (2006.01) |
| B05D 1/00 | (2006.01) |
| B32B 37/00 | (2006.01) |
| B32B 37/12 | (2006.01) |
| B05B 7/26 | (2006.01) |
| B05B 12/08 | (2006.01) |

(Continued)

(52) U.S. Cl.
CPC .............. *B05C 1/0834* (2013.01); *B05B 7/26* (2013.01); *B05B 12/081* (2013.01); *B05C 1/0813* (2013.01); *B05D 1/00* (2013.01); *B05D 5/10* (2013.01); *B32B 37/0053* (2013.01); *B32B 37/1284* (2013.01); *B05D 1/28* (2013.01); *B05D 2252/02* (2013.01); *B05D 2503/00* (2013.01)

(58) Field of Classification Search
CPC ......................... B05C 1/0834; B32B 37/0053
See application file for complete search history.

(56) References Cited

U.S. PATENT DOCUMENTS 2,406,470 A * 8/1946 Maxim ................ D21H 5/0035
118/262
3,106,480 A * 10/1963 Baker ..................... B44D 3/225
427/286

(Continued)

FOREIGN PATENT DOCUMENTS

| CA | 928962 A | 6/1973 |
| JP | 2011-219698 | * 11/2011 |
| WO | 2011126702 A2 | 10/2011 |

OTHER PUBLICATIONS

PCT/US2016/021648, International Search Report and Written Opinion dated Aug. 5, 2016.

(Continued)

*Primary Examiner* — J C Jacyna

(57) ABSTRACT

An apparatus and process for the delivery of material to rolls of a laminator is disclosed.

4 Claims, 2 Drawing Sheets

(51) Int. Cl.
*B05D 5/10* (2006.01)
*B05D 1/28* (2006.01)

(56) References Cited

U.S. PATENT DOCUMENTS

| | | | | |
|---|---|---|---|---|
| 3,115,433 A * | 12/1963 | Eolkin | ............... | F26B 17/286 |
| | | | | 101/364 |
| 3,713,945 A * | 1/1973 | Bjorksten | ............ | B32B 27/00 |
| | | | | 156/278 |
| 4,446,814 A * | 5/1984 | Abendroth | .......... | B05C 1/0813 |
| | | | | 118/262 |
| 4,963,400 A * | 10/1990 | Bibbee | ............... | B05C 1/0834 |
| | | | | 118/227 |
| 2001/0027747 A1* | 10/2001 | Quetti | ............... | B05C 1/0865 |
| | | | | 118/244 |
| 2004/0014860 A1 | 1/2004 | Meier et al. | | |
| 2004/0101630 A1* | 5/2004 | Buecher | ............ | B05C 1/0813 |
| | | | | 427/428.12 |
| 2009/0038270 A1* | 2/2009 | Mahon | ............... | B29B 7/7615 |
| | | | | 53/469 |
| 2010/0243124 A1* | 9/2010 | Sartoni | ............... | A24C 5/472 |
| | | | | 156/64 |
| 2014/0024513 A1* | 1/2014 | Robert | ............... | C09J 153/02 |
| | | | | 493/331 |
| 2014/0106173 A1 | 4/2014 | Booth et al. | | |
| 2015/0005161 A1* | 1/2015 | Koga | ............... | B32B 37/1284 |
| | | | | 503/200 |
| 2016/0185086 A1 | 6/2016 | Hsu et al. | | |

OTHER PUBLICATIONS

PCT/US2016/021648, International Preliminary Report on Patentability dated Nov. 30, 2017.

* cited by examiner

US 10,864,543 B2

MATERIAL DELIVERY SYSTEM FOR LAMINATOR

REFERENCE TO RELATED APPLICATIONS

The present application claims the benefit of U.S. Provisional Application No. 62/162,113, filed on May 15, 2015.

FIELD OF INVENTION

The present invention relates to an apparatus and process useful for delivering material to a laminator.

BACKGROUND OF THE INVENTION

Laminating adhesives have been widely used in flexible packaging applications, such as for the food, pharmaceutical, and consumer durable industries. Solvent free polyurethane laminating adhesives are gaining more and more significance in the market place because of ability of the technology to achieve lower energy footprint and higher conversion efficiency. State-of-the-art laminators require polyurethane adhesives with extended pot life, more than 30 minutes at processing temperature. The long pot life is needed to achieve uniform coating of the adhesives at desired line speed and avoid any defects and appearance issues. However, the extended pot life slows down the cure, the bond strength build-up, the NCO decay, and the primary aromatic amine decay (PAA), therefore delaying the shipping of the goods.

Reactivity of polyurethane adhesives can be tailored by a number of different means, such as change of functionality, type of isocyanates (aromatic or aliphatic), molecular weight, and molecular structure of the isocyanates and the isocyanate reactive compounds. Catalysts can be used as well to tailor the reactivity as described in a number of prior arts. It is practical to design polyurethane adhesives with pot life ranging from a few minutes to as long as hours. A shorter pot life results in faster curing, faster bond development, faster NCO decay, faster PAA decay, higher coating weight, and faster shipping with finished goods, therefore, improved conversion efficiency. However, due to limitations of existing commercial laminators, polyurethane adhesives with a short pot life, such as for example shorter than 30 minutes, often experience difficulties in producing consistent high quality laminates due to rapidly increasing viscosity. This can be attributed to the extended residence time of the adhesive between Roll #1 and Roll #2 in commercial laminators, as shown in FIG. 1 due to excessive amount of adhesive applied between the two rolls. If the amount of adhesive between the two rolls can be minimized to reduce the residence time of the adhesive, then polyurethane adhesives with shorter pot life can potentially work in laminating applications as well. Current material delivery setups do not allow for efficient mixing of components with significant difference in viscosity, extreme mixing ratio, and precise flow control over a wide flow rate. These limitations prevent synchronization of a mixing machine with the laminator and make it difficult to adjust the flow rate of the mixing unit to match the depletion rate of the adhesive between the two rolls. Furthermore, short pot life risks material build-up over time that may require frequent cleaning of the rolls, which results in lost productivity.

Therefore, a material delivery system which allows for precise control over a wide range of low rates, efficient mixing of components with extreme ratios and significant difference in viscosities, minimum residence time of the adhesive and efficient cleaning of the rolls via multiple automatic cleaning systems, is desired.

SUMMARY OF THE INVENTION

In one embodiment of the present invention, there is disclosed an apparatus for dispensing material between two rolls of a laminator comprising: a) at least two reactant storage tanks, each reactant storage tank having a gear pump; b) a mixer connected to the gear pumps; c) a dispensing nozzle connected to the mixer; d) a level detector mounted on a rail between the two rolls; and e) at least one solvent storage container connected to the mixer.

In another embodiment of the present invention, there is disclosed a process for dispensing material between two rolls of a laminator comprising: a) releasing at least two reactants from separate reactant storage tanks; b) contacting the reactants with a mixer having a mixing speed in the range of from 1000 rpm to 8000 rpm and; c) mixing the reactants in the mixer for less than 60 seconds to form mixed product; d) depositing the mixed product into a dispensing nozzle; e) dispensing mixed product from the dispensing nozzle between the two rolls; f) discontinuing the release of the reactants; g) releasing a first solvent from a first solvent storage container; h) contacting the first solvent with the mixer i) depositing the first solvent into the dispensing nozzle; j) dispensing the first solvent from the dispensing nozzle between the two rolls; k) discontinuing the release of the first solvent; and l) repeating steps a) through e).

DETAILED DESCRIPTION

Figure 1:
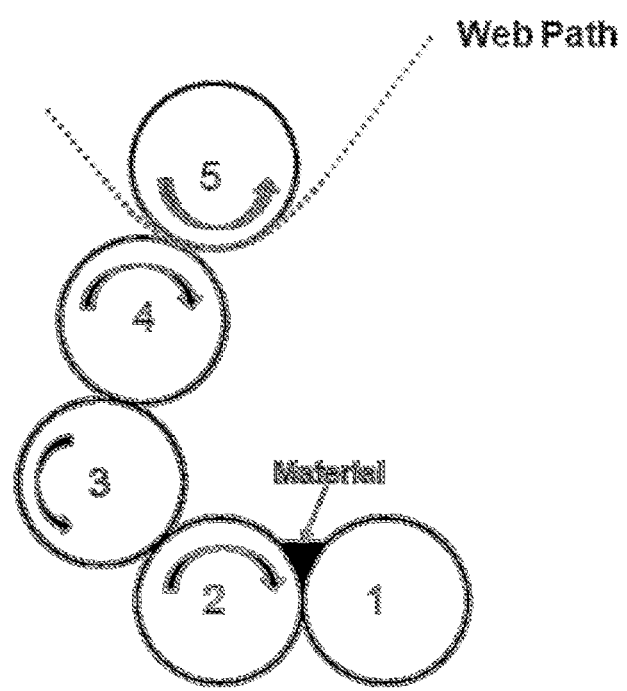
FIG. 1 depicts a laminator with five rolls.

The apparatus generally can be used with a laminator device suitable for laminating adhesives. In an embodiment, the apparatus is used with a laminator which comprises five rolls, as shown in FIG. 1. Roll 1 is referred to as a metering roll and is stationary. Roll 2 is referred to as a transfer roll, is adjacent to Roll 1 and rotates. Roll 3 is referred to as a differential speed roll, is adjacent to Roll 2, and rotates in the opposite direction of Roll 2. The adhesive quantity that is applied to the laminate is determined by Roll 3. Roll 4 is referred to as the application roll, is adjacent to Roll 3, and rotates in the opposite direction as Roll 3. Roll 5 is referred to as the metering roll, is adjacent to Roll 4, and rotates in the opposite direction as Roll 4. The rolls can be made of rubber or steel. In an embodiment, Rolls 3 and 5 are made of rubber and Rolls 1, 2, and 4 are made of steel. Adhesive is typically delivered to the gap between Rolls 1 and 2, which can be adjusted as desired. The adhesive is applied to one or more substrates between Rolls 4 and 5. In various embodiments, the one or more substrates can be a polymer film, a metalized polymer film, or a foil. More preferred are embodiments in which the curable adhesive composition is used to bond together two polymer films, a polymer film and a metalized polymer film, or a polymer film and a foil. Preferred polymer films contain organic polymer. Examples of organic polymers used in the films include, but are not limited to polyesters, polyolefins (including copolymers of olefins with other monomers), polyamides, and blends thereof. More preferred organic polymers are polyethylene terephthalate, polyethylene, polypropylene, and nylon.

Figure 2:
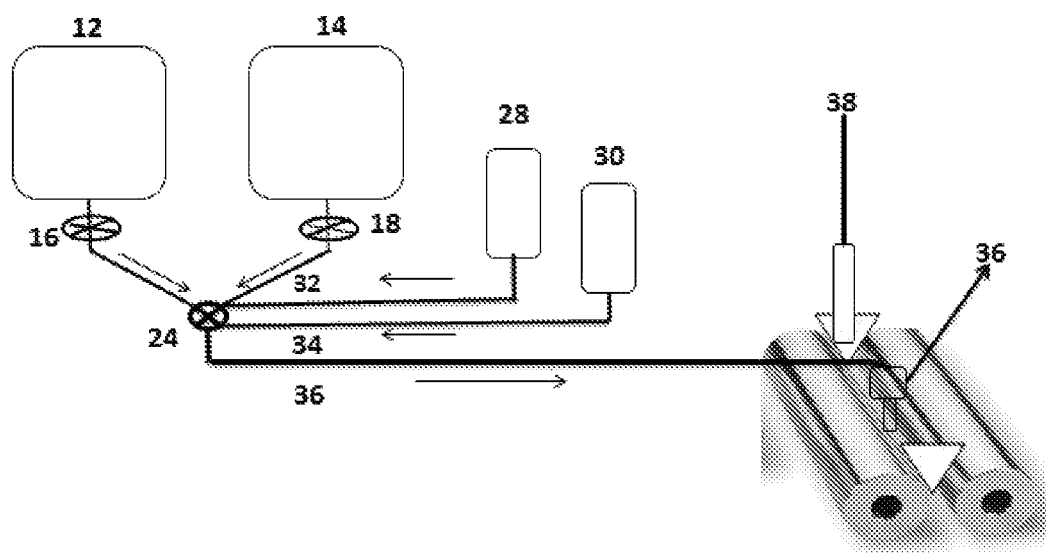
FIG. 2 is a material delivery apparatus.

In its simplest form, the apparatus 10 of the present invention comprises reactant storage tanks 12 and 14; gear pumps 16 and 18 capable of controlling the flow rate in reactant storage tanks 12 and 14 respectively; a mixer 24; solvent storage containers 28 and 30; dispensing nozzle 36 which dispenses material between rolls 1 and 2 of a laminator (rolls 3, 4, and 5 are not shown in FIG. 2); and level detector 38. Conduits 20, 22, 26, 32, and 34 are tubes which can be made of steel, and can optionally be flexible. The tubes can also be rigid and flexible in different parts depending on the need. In an embodiment, the dispensed material is an adhesive.

The apparatus includes a plurality of reactant storage tanks. Generally, the reactant storage tanks can be of any size suitable for industrial applications. The tanks may be of a material which can withstand at least 1 atm pressure. Examples include, but are not limited to stainless steel and carbon steel. In various embodiments, the reactant storage tanks can be equipped with agitation, nitrogen padding heating, and degassing capabilities.

Each reactant storage tank is equipped with a gear pump. The gear pump can be any device which allows precise control of flow rate. In various embodiments, the gear pump is a device which allows for precise control of flow rate at a flow rate in the range of from 1 lb/min to 30 lbs/min. Gear pumps and the tubes connected to them are properly sized to achieve precise control of flow rate. In various embodiments, the flow rate is between 0.5 lbs/min to 50 lbs/min, is between 2 lbs/min to 35 lbs/min in various other embodiments, and is between 2.5 lbs/min to 25 lbs/min in various other embodiments.

In various embodiments, the mixer is a dynamic mixer which allows high-speed mixing of components having a significant difference in viscosity at an extreme mixing ratio, such as for example, from 5:95 reactant 1:reactant 2 to 95:5 reactant 1:reactant 2. The mixer is generally capable of operating between 100 rpm to 10,000 rpm, 1000 rpm to 8000 rpm in various other embodiments, and most preferably 4000 rpm to 6000 rpm in various other embodiments. In addition, the residence time of the reactants in the mixing chamber is generally less than 60 seconds, less than 30 seconds in various embodiments, and less than 10 seconds in various other embodiments. Furthermore, the mixing unit is designed to mix components with significant difference in viscosity at extreme mixing ratios, with the ratio of viscosity of reactant 1 to that of reactant 2 ranging from 1:1 to 1:100, and the mixing ratio between the two components from 5:100 to 100:5.

In various other embodiments, the mixer is a static mixer which can be used if reactants 1 and 2 have similar viscosities and the mixing ratio is about 1:1.

The mixed product is deposited into a dispensing nozzle. The configuration of the nozzle can be standard or specialized, with the aim to achieve leveling of the adhesive in between rolls 1 and 2. To facilitate leveling of the adhesive, the nozzle can be mounted on an arm that allows it to travel back and forth along the direction of axis of the rolls at least 4 times per minute, 8 times per minute in various embodiments, and 10 to 15 times per minute in various other embodiments.

A level detector that detects high and low levels of the mixed product in between rolls 1 and 2 is electronically connected to the gear pumps of the reactant storage tanks, allowing increase of flow rate at a low level and decrease of flow rate at a high level.

An automatic cleaning system comprises at least one solvent storage container connected to the mixer via a conduit, such as a tube. Each solvent storage container is made of stainless steel or carbon steel capable of withstanding pressures of at least 50 psi, preferably 70 to 100 psi. The cleaning system is used to clean the mixer and rolls during change-over and/or when build-up is visible on the rolls. Common cleaning solvents, such as dibasic ester, Benzoflex, TXIB, polyether polyols, or low molecular alcohols are suitable. To avoid contamination of these solvents to the laminates, it is desirable to have a second solvent in a second solvent storage container using solvents such as MEK, or ethyl acetate. The second solvent storage container is also connected to the mixer via a tube.

The apparatus can be equipped with a variety of wires, computers, and other devices to operate the apparatus electronically.

An embodiment of the process of the instant invention is illustrated using the above-described apparatus 10. Reactant storage tanks 12 and 14 contain reactants 1 and 2, respectively. Gear pumps 16 and 18 control the release of the reactants. When reactants 1 and 2 are released, they travel via conduits 20 and 22 respectively to mixer 24. They are then mixed and the subsequent mixed product is sent to nozzle 36 via conduit 26 where it is dispensed between rolls 1 and 2. Level detector 38 sends feedback to each gear pump.

When the procedure is stopped, and the laminator is turned off, the cleaning process then occurs. The gear pumps are shut off to block flow of the reactants and the rolls of the laminator are stopped. Rolls 1 and 2 are then disengaged and the excess mixed product is drained into a catch pan or scooped out manually. Rolls 1 and 2 are then reengaged and rolls 4 and 5 are disengaged. The first cleaning solvent is released from the solvent storage container 28 and rolls 1 and 2 of the laminator are turned back on. The first cleaning solvent flows through conduit 32 to mixer 24 and through conduit 26 to rolls 1 and 2. After the first cleaning solvent has been used for the desired amount of time, the flow of the first cleaning solvent is stopped and the second cleaning solvent is released from solvent storage container 30. The second cleaning solvent flows through conduit 34 to mixer 24 and through conduit 26 to rolls 1 and 2. After a period of time, the flow of solvent out of solvent storage container 30 is stopped. In another embodiment, a cleaning device can be used above roll 4 in order to clean roll 4. After the flow of the second cleaning solvent is stopped, rolls 1 and 2 are stopped, and rolls 4 and 5 are reengaged. The entire process can then start again.

All the steps above can be programmed and controlled electronically (ie. via a computer) or optionally performed manually or a combination of the two.

A variety of adhesive chemistries can be used with the apparatus and process of the instant invention. Examples include, but are not limited to a polyurethane-based system, an epoxy-based system, an acrylate-based system, a Michael addition chemistry-based system, and a hybrid chemistry-based system of these.

Examples of reactant 1 in a polyurethane-based system include, but are not limited to aromatic polyisocyanates, such as methylene bis (p-phenyl isocyanate) (MDI), toluene diisocyanate (TDI), 3,3-bitoluene diisocyanate (TODI), 1,5-naphthalene diisocyanate (NDI), and para-phenylene diisocyanate (PPDI); and reaction products of at least of one of the isocyanates with at least one isocyanate reactive compound, such as polyurethane prepolymers, and polyurea prepolymers.

In alternate non-limiting embodiments, the polyisocyanate can also be aliphatic or cycloaliphatic polyisocyanates, cyclic dimers and cyclic trimers thereof, and mixtures thereof. Non-limiting examples of suitable aliphatic polyisocyanates can include but are not limited to 1,4-bis(isocyanatomethyl)cyclohexane, 1,3-bis(isocyanatomethyl)cyclohexane, isophorone diisocyanate (IPDI), cyclohexyl diisocyanate (CHDI), methylene bis (p-cyclohexyl isocyanate) (H12MDI), 1,3-bis(1-isocyanato-1-methylethyl)-benzene, 1,6-hexane diisocyanate, uretidione and trimer isocyanurates therefrom, such as Desmodur N 3300 (hexamethylene diisocyanate trimer) which is commercially available from Bayer, Desmodur N 3400 (60% hexamethylene diisocyanate dimer and 40% hexamethylene diisocyanate trimer), mixtures thereof, and reaction products of at least of one of the isocyanates with at least one isocyanate reactive compound, such as polyurethane prepolymers, and polyurea prepolymers.

Examples of reactant 2 in a polyurethane-based system include, but are not limited to polyether polyols, polyester polyols, polycarbonate polyols, polybutadiene polyols, multi-hydroxyl functional polyacrylates, and copolymers and mixtures thereof with molecular weights from 300 to 25,000 and functionality from 2 to 8, and short chain glycols with molecular weights of less than 300 and functionality from 2 to 8, such as ethylene glycol diethylene glycol, propylene glycol, dipropylene glycol, trimethylpropane, diethylene glycol, triethylene glycol, tetraethylene glycol, tripropylene glycol, 1,2-, 1,3- and 1,4-butanediol, 2,2,4-trimethyl-1,3-pentanediol, 2-methyl-1,3-pentanediol, 1,3-2, 4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, and isomers and mixtures thereof.

Examples of reactant 1 in an epoxy-based system include but are not limited to aliphatic, cycloaliphatic, or aromatic liquid epoxy resins or mixtures thereof such as bisphenol A or bisphenol F diglycidyl ethers, hexenediol diglycidyl ether, cycloaliphatic diglycidyl ethers, trimethylpropane triglycidyl ethers, 1,4 butadiene diglycidyl ether, cyclohexanedimethanol diglycidyl ether, also advanced aliphatic or aromatic epoxy resins and mixtures thereof.

Examples of reactant 2 in an epoxy-based system include but are not limited to aliphatic amines, aliphatic amine adducts, ketmines, Mannich base adducts, polyether amines, arylyl amines, polyamides, cycloaliphatic amines, amidoamines, carboxylic functional polyesters, acid anhydrides, mercaptans, cyclic amidines, cyanate esters, and mixtures thereof. Examples of reactant 1 in a Michael addition chemistry-based system include, but are not limited to di, tri, and multi α,β-unsaturated carbonyl functional group-containing materials, blends of di, tri, and multi α,β-unsaturated carbonyl functional group-containing materials and mixtures thereof with epoxy resins, polyisocyanates, polyurethane prepolymers, urethane acrylates, polyester acrylates, polyester-urethane acrylates, acrylic polyol acrylates, and di, tri, and multifunctional acrylates.

In an embodiment, the β-dicarbonyl compound is selected from the group consisting of β-keto esters, β-diketones, β-keto amides, β-keto anilides, and mixtures thereof. In another embodiment, a preferred β-dicarbonyl compound is selected from the group consisting of methyl acetoacetate, ethyl acetoacetate, 2-(methoxyethyl) acetoacetate, glycidyl acetoacetate, acetoacetanilide, 2,4-pentanedione, and mixtures thereof.

In another embodiment, a preferred multifunctional acrylate is selected from the group consisting of trimethylolpropane triacrylate, di-trimethylolpropane triacrylate, dipropylene glycol diacrylate, hexanediol diacrylate, pentaerythritol triacrylate, pentaerythritol tetraacrylate, isocyanurate triacrylate, bisphenol A epoxy diacrylates, epoxy novolac polyacrylates, urethane diacrylates, polyester polyacrylates, metallic (meth)acrylates, and mixtures thereof.

Examples of reactant 2 in a Michael addition chemistry-based system include, but are not limited to di, tri, and multi thiols, di and/or tripolyamines and mixtures thereof, di, tri, and multi acetoacetoxy-containing materials and mixtures thereof.

Other reactants that can be used include carbamide-terminated materials, and di, tri, and multi aliphatic or aromatic aldehydes.

Other chemistries that can be used with the apparatus and process of the present invention are curing chemistries, such as blends of polyisocyanates with epoxy materials or acrylates curing with blends of polyols with amines or other proton donor materials.

The solvents used in the cleaning system are generally selected from the group consisting of dibasic esters, polyols, short chain glycols, such as ethylene glycol, diethylene glycol, dipropylene glycol, diethylene glycol dibenzoate, diester of hexanol, diterephthalate, ethyl acetate, butyl acetate, acetone, methyl ethyl ketone, methyl butyl ketone, xylene, toluene, and combinations thereof.

In various embodiments, the first solvent that can be used in the cleaning system includes, but is not limited to dibasic esters, polyols, short chain glycols, such as ethylene glycol, diethylene glycol, dipropylene glycol, diethylene glycol dibenzoate, diester of hexanol, diterephthalate, and mixtures thereof.

In various embodiments, the second solvent in the cleaning system can be selected from the group consisting of ethyl acetate, butyl acetate, acetone, methyl ethyl ketone, methyl butyl ketone, xylene, toluene, and combinations thereof.

What is claimed is:

1. An apparatus for dispensing material between two rolls of a laminator comprising:
    a) at least two reactant storage tanks, each reactant storage tank having a gear pump;
    b) a mixer connected to the gear pumps;
    c) a dispensing nozzle connected to the mixer;
    d) a level detector mounted on a rail configured to be between the two rolls of the laminator; and
    e) at least one solvent storage container connected to the mixer.

2. The apparatus of claim 1 wherein the level detector is electronically connected to the gear pumps of the reactant storage tanks.

3. The apparatus of claim 1 wherein the mixer has a mixing speed in the range of from 1000 rpm to 8000 rpm.

4. A laminator apparatus comprising a plurality of rolls and further comprising the apparatus of claim 1.

* * * * *